UNITED STATES PATENT OFFICE.

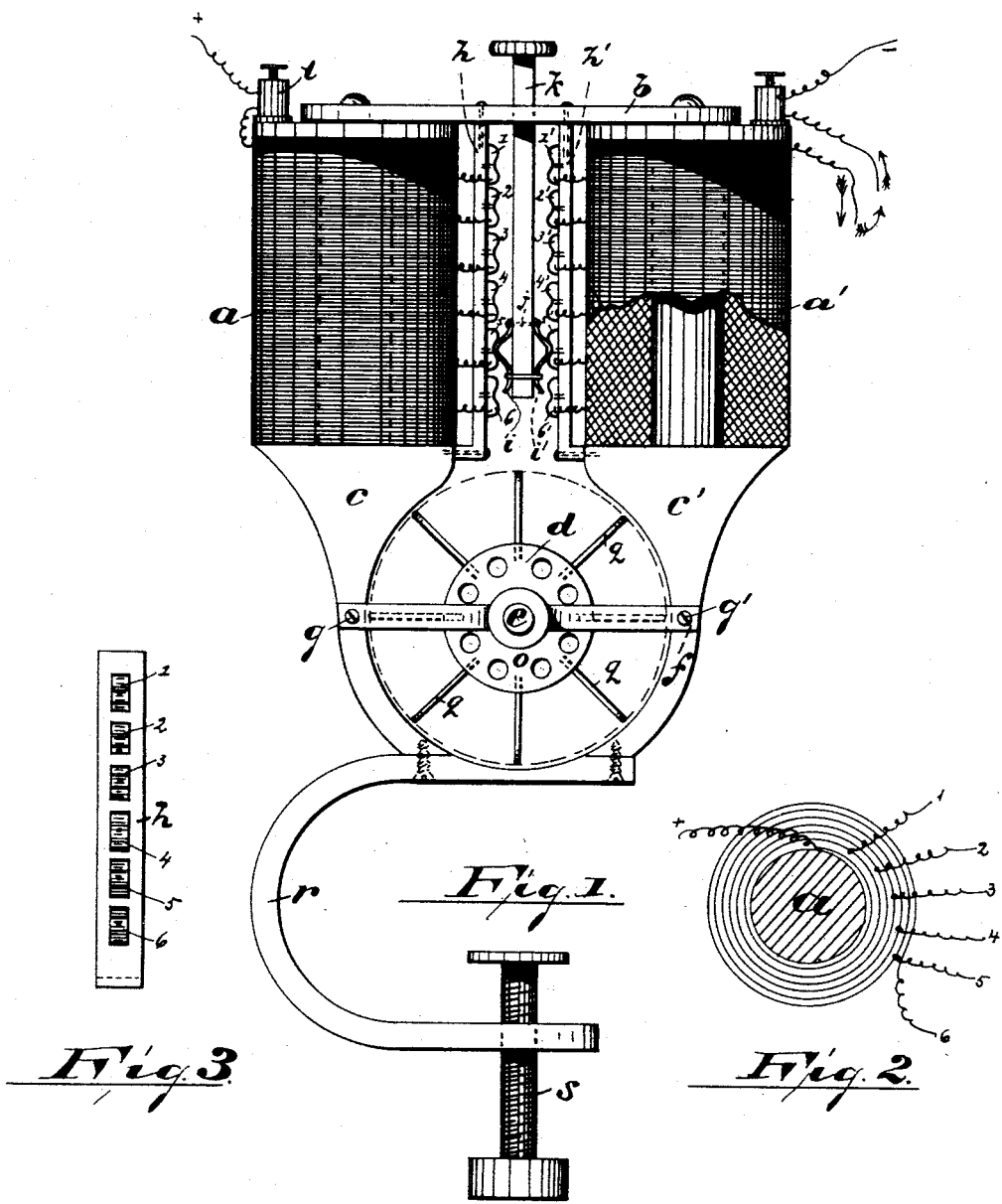

ALFRED GARTNER, OF NEWARK, NEW JERSEY, ASSIGNOR, BY MESNE ASSIGNMENTS, TO ALBERT A. SCHMIDT, OF SAME PLACE.

ELECTRIC MOTOR AND GENERATOR.

SPECIFICATION forming part of Letters Patent No. 439,775, dated November 4, 1890.

Application filed August 16, 1889. Serial No. 320,922. (No model.)

*To all whom it may concern:*

Be it known that I, ALFRED GARTNER, a subject of the Emperor of Austria, residing at Newark, in the county of Essex and State of New Jersey, have invented certain new and useful Improvements in Electric Motors and Generators; and I do hereby declare the following to be a full, clear, and exact description of the invention, such as will enable others skilled in the art to which it appertains to make and use the same, reference being had to the accompanying drawings, and to letters or numerals of reference marked thereon, which form a part of this specification.

The object of this invention is to simplify the construction of electric motors and to provide a perfect and effective system of regulating the power and speed of the same.

The invention consists in the improved electric motor and regulator attachment and the combination of parts hereinafter more fully set forth, and finally embodied in the clauses of the claim.

Referring to the accompanying drawings, in which like letters of reference indicate corresponding parts in each of the several figures, Figure 1 is a side view of my improved electric motor and regulator. Fig. 2 is a cross-section through one of the magnets, showing the manner of winding them and the connections in various places within the coil with the regulator-bars, as will be hereinafter more fully described. Fig. 3 is a plan view of one of the regulator-bars.

In said drawings, $a$ $a'$ represent two electric magnets connected by the cross-bar $b$. Between the field-magnet poles $c$ $c'$ the armature $d$ moves on a shaft $e$, supported in the cross-bar $f$, secured to the field-magnet poles by means of screws $g$ $g'$. On the inside of the electro-magnets $a$ $a'$ are secured the regulator-bars $h$ $h'$, made of hard rubber or any kind of insulating material. These bars are provided with metallic spring-plates 1 1', 2 2', 3 3', 4 4', 5 5', and 6 6', and each of these spring-plates is connected by a short wire with the wire coil of the magnets, as shown in Fig. 2.

In winding my magnets as soon as the wire has been wound up and down the entire length of the core as often as desired a short piece of wire is attached to the coil and marked 1, and the winding is then continued until the wire has made another coil like the first, when another short piece of wire is attached to the coil and marked 2. The winding is then continued as before and short pieces of wire attached to each coil and marked 3, 4, 5, &c., until the magnet-coil is completed. These short pieces of wire extend wholly out of the coil, as shown in Fig. 2, and are arranged to pass through the insulators $h$ and $h'$, as shown in Fig. 1.

Between the regulator-bars $h$ $h'$ and guided by the cross-bar $b$ slides another insulated bar $k$, provided on its lower end with metallic springs $i$ $i'$, connected together by a metallic pin $j$, so as to allow the current to pass from one of the spring-plates on one side through the spring $i$ $i'$ and pin $j$ to the spring-plates on the other side. The armature consists of two perforated side plates $o$ $o'$, secured on the shaft $e'$, and these plates are provided with soft-iron arms $q$ $q'$. The wire is wound in the usual manner, and each section of the armature is separately connected with the commutator, (not shown in the drawings,) as will be understood.

The lower part of the motor is secured to a yoke $r$, provided with a tightening-screw $s$, as is readily understood in Fig. 1.

In operating my device the current passes from the battery through the binding-post $t$, electro-magnet $a$, spring-plate 5, metallic springs $i$ $i'$, pin $j$, spring-plate 5', and electro-magnet $a'$ to the armature by means of commutators and back to the battery.

When I want to reduce the speed and power of my motor, I slide the bar $k$ up and the current will go through less wire, as shown in Fig. 3, and in this way give less magnetic force to the fields. In such way I am able according to the number of branch connections and spring-plates to give any speed to the shaft $e$.

I do not intend to limit myself to the form of construction herein shown, as various changes can be made without changing the scope of my invention.

Having thus described my invention, what I claim as new, and desire to secure by Letters Patent, is—

In an electric motor, the combination of an insulating sliding and regulating bar, two metallic springs on the lower end of said bar and arranged opposite each other, a pin connecting said springs, two stationary insulating-bars arranged alternately opposite the sliding bar, and a series of springs secured to said stationary bars, each of said springs being connected with the coils of the magnets, as shown, said combination of parts being adapted to increase or diminish the magnetic force, as described, and for the purposes set forth.

In testimony that I claim the foregoing I have hereunto set my hand this 25th day of March, 1889.

ALFRED GARTNER.

Witnesses:
WALTER THOMPSON,
ALBERT A. SCHMIDT.